June 19, 1928.

J. R. GAMMETER

TUBE AND METHOD OF MAKING SAME

Filed Aug. 3, 1925
Original Filed Aug. 3, 1925

Re. 16,999

Inventor
John R. Gammeter
By Pierson, Eakin & Avery
Attys.

Reissued June 19, 1928.

Re. 16,999

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

TUBE AND METHOD OF MAKING SAME.

Original No. 1,663,754, dated March 27, 1928, Serial No. 47,650, filed August 3, 1925. Application for reissue filed April 11, 1926. Serial No. 269,176.

This invention relates to the tube-making art, and especially to the manufacture of annular rubber tubes such as inner tubes for tires.

Its chief objects are economy of time and labor and improved adhesion of the plies of a laminated tube. A more specific object is to provide improved procedure and apparatus for forming tubes from freshly calendered stock, which may be taken directly from the calender, and thus to avoid the expense of storage and of the employment of equipment such as liners for storing and handling the calendered stock. A further object is the provision of an improved seam in a longiudinally seamed, laminated tube.

Figure 1:
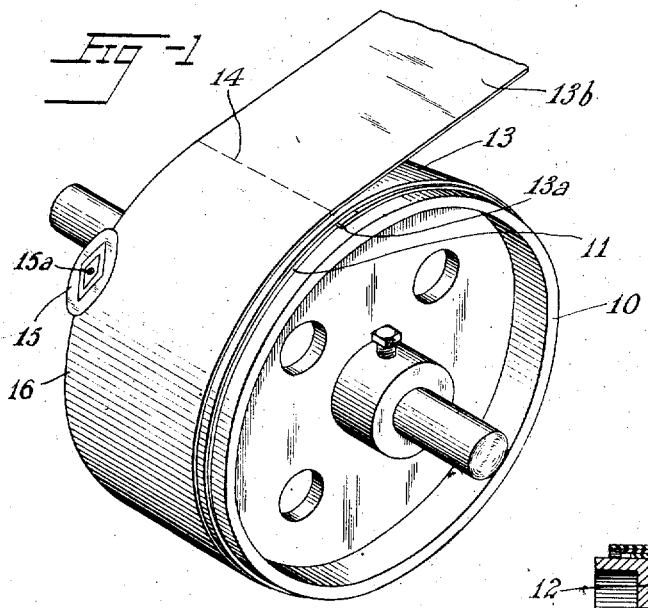
Figure 1 is a perspective view of a tube-building drum embodying and adapted to carry out my invention, with the work in place thereon.

Referring to the drawings, the apparatus comprises a drum 10 adapted to be mounted for rotation and having upon its outer face an annular band 11 of flexible, elastic, non-adhesive material such as vulcanized rubber, this band preferably being formed with a middle rib 12 on its inner face, set into a groove on the surface of the drum, so as to maintain the band properly centered upon the drum.

Figure 2:
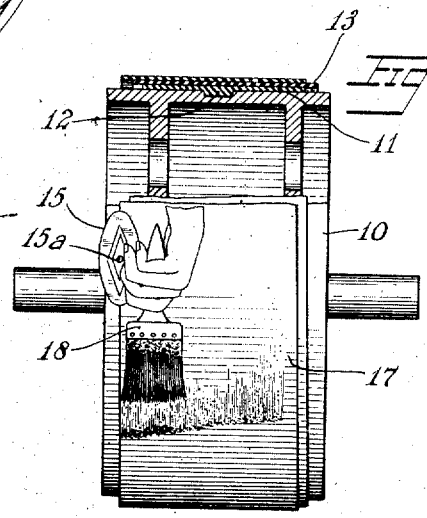
Fig. 2 is a side elevation of the same, at a later stage of operation, parts being sectioned and broken away.

In the practice of my method in its preferred form, a strip 13 of calendered stock is drawn from a source of supply such as a calender and wound upon the drum 10 over the band 11, the winding being given such helical form that the margins of each turn of the material are slightly off-set from those of the preceding turn, as will be understood upon reference to Figs. 1 and 2.

The successive convolutions may be progressively compacted against each other by any suitable rolling means during the winding operation and when the stock is drawn directly from the calender the warm and tacky condition of the rubber results in strong adhesion of the plies.

When the desired number of plies have thus been drawn onto the drum, the strip 13 is severed, as upon the line 14 of Fig. 1, preferably at the same position circumferentially of the drum as that of the leading end $13^a$ of the winding, and the residue $13^b$ of the stock strip is freed from the drum assembly.

A valve stem patch 15 is then mounted upon the margin of the winding at which the last wound ply overhangs the underlying plies, as shown in Figs. 1 and 2, and the valve stem hole $15^a$ is punched in the patch and through the underlying tube stock. The exposed outer surface of the winding, except the margin 17 (Fig. 2) opposite that to which the valve stem pad is attached, is treated with a wash consisting of a highly volatile liquid containing a suitable substance in solution or suspension to prevent adhesion of the rubber when the solvent evaporates, which occurs quickly because of the warm condition of the stock when it is drawn directly from the calender. A suitable wash for this purpose is a solution, which may be super-saturated of stearic acid in alcohol. The wash readily may be applied by means of a paint brush, 18, Fig. 2, held against the work while the drum is rotated.

After the solvent has evaporated, the margin 16, upon which the valve stem patch is mounted, is progressively turned over to approximately the middle line of the assembly, together with the adjacent margin of the non-adhesive underlying band 11, which may be readily accomplished by rotating the drum and manipulating the said margins with a suitable turning tool, as will be readily understood by those skilled in the art.

Figure 4:
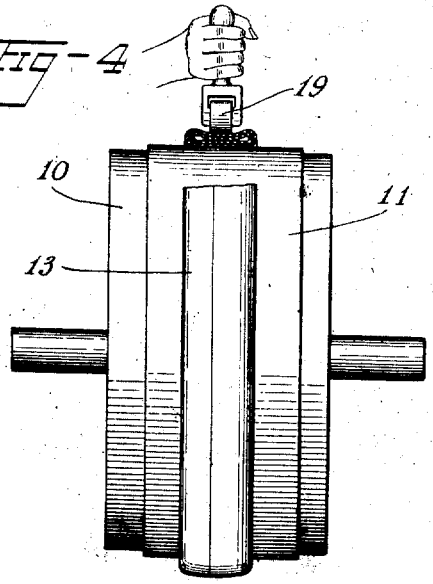
Fig. 4 is a side elevation of the same at a still later stage of operation.
Figure 3:
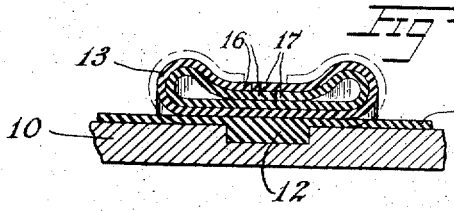
Fig. 3 is a section of a part of the drum and the work thereon at a later stage.

The opposite margins of the band 11 and of the work are then similarly turned over and the margins of the winding of the tacky rubber strip 13 are progressively joined together in the mis-matched interfitted relation which is clearly shown in Fig. 3. The portion of the valve stem patch 15 which projects from the margin 16 contacts and is stuck to the inner face of the inner ply of the margin 17, so that it lies within the resulting tube, bridging the seam. The seam is then compacted by rotating the drum with the work thereon while holding a roller 19 (Fig. 4) against the middle portion of the work.

The tube is then removed from the drum, turned so that the seam and valve stem patch are on its inner periphery, and is vulcanized under internal fluid pressure such as to prevent contact and adhesion of its inner surfaces, and preferably in a mold, a valve stem preferably being inserted prior to the vulcanization.

The method results in an improved longitudinally seamed tube of which the seams of the several plies are mis-matched, and having the same number of plies at all parts of the tube. The employment of the flexible band 11 permits the tacky rubber plies to be turned over and joined without the employment of other precaution against undesired adhesion thereof.

Modifications may be employed within the scope of my invention and I do not wholly limit my claims to the specific description herein given by way of illustration.

I claim:

1. The method of making an annular tube which comprises helically winding in a plurality of plies a continuous strip of tube-forming material to provide an annular structure with stepped margins, and joining said margins to each other in interfitted relation.

2. The method of making a rubber tube which comprises forming a strip of unvulcanized rubber with longitudinal margins of diminishing thickness toward the edges of the strip, folding said margins over into overlapped relation to each other and joining them together, and vulcanizing the resulting tubular structure while holding it distended against an enclosing mold by internal fluid pressure.

3. The method of making an annular rubber tube which comprises winding a plurality of layers of tacky rubber stock onto a form with one layer offset from another, to provide stepped margins, folding the stepped margins into contact with each other and joining them together in interfitted relation, with the two edge faces of each ply substantially abutting each other, and vulcanizing the resulting tube in a mold under internal fluid pressure.

4. A tube comprising laterally offset layers of sheet material, the margins of each layer being joined in a longitudinal butt seam, the seams of the layers being mis-matched, and a plurality of the layers comprising a continuous winding of material common to the said layers.

5. A method as defined in claim 2 in which the material of the structure is fed into said structure in a continuous length from the position at which it is given strip form.

6. The method of making a rubber tube which comprises forming a strip of unvulcanized rubber in sheet form, folding over the side margins of the strip into contact with each other and joining them in a seam while the rubber continues to be in an unvulcanized condition, and vulcanizing the resulting tubular structure while holding it distended against an enclosing mold by internal fluid pressure, the strip being formed by calendering and made into a tube before it cools to room temperature.

7. A tube comprising a plurality of superposed and directly united layers of rubber, the longitudinal margins of each layer being joined before vulcanization in a butt seam and coalesced by vulcanization and the seams of the layers being mismatched.

8. An endless tube comprising a plurality of superposed and directly united tubular layers of rubber, the longitudinal margins of each layer being joined before vulcanization in a butt seam and coalesced by vulcanization and the seams of the layers being mismatched.

9. An annular rubber tube comprising a strip of rubber having its margins joined directly to each other in a longitudinal, annular, lapped seam of the beveled type before vulcanization and coalesced by vulcanization under fluid pressure.

In witness whereof I have hereunto set my hand this 10th day of April, 1928.

JOHN R. GAMMETER.